United States Patent
Jose et al.

(10) Patent No.: US 11,436,200 B2
(45) Date of Patent: Sep. 6, 2022

(54) FAULT TOLERANT PARALLEL JOURNALING FOR FILE SYSTEMS

(71) Applicant: VMWARE, INC., Palo Alto, CA (US)

(72) Inventors: Prasanth Jose, Bangalore (IN); Pradeep Krishnamurthy, Bangalore (IN); Gurudutt Kumar Vyudayagiri Jagannath, Bangalore (IN); Vivek Patidar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 231 days.

(21) Appl. No.: 16/808,417

(22) Filed: Mar. 4, 2020

(65) Prior Publication Data
US 2021/0216508 A1 Jul. 15, 2021

(30) Foreign Application Priority Data
Jan. 13, 2020 (IN) .............................. 202041001478

(51) Int. Cl.
| | |
|---|---|
| *G06F 16/14* | (2019.01) |
| *G06F 16/18* | (2019.01) |
| *G06F 21/64* | (2013.01) |
| *G06F 11/14* | (2006.01) |
| *G06F 11/07* | (2006.01) |
| *G06F 16/215* | (2019.01) |

(52) U.S. Cl.
CPC ...... *G06F 16/1815* (2019.01); *G06F 11/0793* (2013.01); *G06F 11/1471* (2013.01); *G06F 16/152* (2019.01); *G06F 16/1858* (2019.01); *G06F 16/215* (2019.01); *G06F 21/64* (2013.01)

(58) Field of Classification Search
CPC ............... G06F 16/152; G06F 16/1815; G06F 16/1858; G06F 16/215; G06F 11/0793; G06F 11/1471; G06F 21/64
See application file for complete search history.

(56) References Cited

U.S. PATENT DOCUMENTS

2017/0357667 A1* 12/2017 Auch ....................... G06F 11/14
2020/0364106 A1* 11/2020 Chen ................... G06F 16/2343

* cited by examiner

*Primary Examiner* — Robert W Beausoliel, Jr.
*Assistant Examiner* — Nirav K Khakhar

(57) ABSTRACT

The disclosure provides for fault tolerant parallel journaling that speeds up both input/output (I/O) operations and recovery operations. Journal entry writing may occur in parallel with data writing operations. Even if a crash occurs during a data writing operation for which the journal entry has been written, the recovery operation will correctly determine that the journal entry is not valid. Additionally, recovery operations may need to validate fewer journal entries, and yet possibly retain more valid data. Examples include: for each of a plurality of journal entries: receiving incoming data; determining a signature for the incoming data; generating the journal entry for the incoming data; writing the signature in the journal entry; and writing the journal entry and the incoming data to a storage media; and based at least on writing data to the storage media, updating an awaiting index in a journal header.

20 Claims, 7 Drawing Sheets

FIG. 4

402a
Number of entries: 2
Awaiting index: 1

404a
File offset: 123
Disk block: 10001
Checksum: XXXX

404b
File offset: 456
Disk block: 10002
Checksum: XXXY

400a

---

402b
Number of entries: 3
Awaiting index: 2

404a
File offset: 123
Disk block: 10001
Checksum: XXXX

404b
File offset: 456
Disk block: 10002
Checksum: XXXY

404c
File offset: 789
Disk block: 10003
Checksum: XXYY

400b

---

402c
Number of entries: 4
Awaiting index: 3

404a
File offset: 123
Disk block: 10001
Checksum: XXXX

404b
File offset: 456
Disk block: 10002
Checksum: XXXY

404c
File offset: 789
Disk block: 10003
Checksum: XXYY

404d
File offset: 999
Disk block: 10004
Checksum: XYYY

400c

---

402d
Number of entries: 5
Awaiting index: 5

404a
File offset: 123
Disk block: 10001
Checksum: XXXX

404b
File offset: 456
Disk block: 10002
Checksum: XXXY

404c
File offset: 789
Disk block: 10003
Checksum: XXYY

404d
File offset: 999
Disk block: 10004
Checksum: XYYY

404e
File offset: 789
Disk block: 10003
Checksum: XXYZ

400d

FAULT TOLERANT PARALLEL JOURNALING FOR FILE SYSTEMS

RELATED APPLICATIONS

Benefit is claimed under 35 U.S.C. 19(a)-(d) to Foreign Application Serial No. 202041001478 filed in India entitled "FAULT TOLERANT PARALLEL JOURNALING FOR FILE SYSTEMS", on Jan. 13, 2020, by VMware, Inc., which is herein incorporated in its entirety by reference for all purposes.

BACKGROUND

A journaling file system keeps a journal (e.g., log) of the changes that are to be made to a file system but that may not have been completed. The purpose is to reduce recovery time and reduce the likelihood of data corruption in the event of a system crash (e.g., resulting from a power failure or data interruption for a storage media). When a write to a new block enters the file system, one or more journal entries are written into the journal, which is commonly a circular log on the same physical disk. In a journaling file system, the journal may maintain a mapping from an offset of the incoming data to the destination block offset in the file system. This mapping is used for subsequent read/write operations for that same offset. The actual write operation is complete only after both the journal write and the data write are complete. In some examples, the journal and the data are stored on separate fixed media (e.g., disks).

Journaling file systems use sequential, rather than parallel, writing of the data (first) and the journal (afterward). This is slow, but is a safety measure because, in the event of a system crash, if data and journal writes had been in parallel, it is possible that the journal write was completed but the data write was not. In such a scenario, a recovery operation using the journal may lead to data corruption. This is because, if the data write had been incomplete, the data on the storage media, in the location where they should have been written, is effectively random. Only then are journal writes sent (e.g., in order to maintain crash consistency). Thus, it is important to ensure that the data write is completed prior to the creation of a journal entry that references the data. Unfortunately, this sequential writing increases latency.

In some journaling file systems, a checksum is used to ensure the integrity of the journal. The journal may span multiple disk blocks, and a checksum is calculated for each journal block and retained in the header of the block. A journal block may contain multiple journal entries. During a recovery operation, if a checksum stored in the header does not match the calculated checksum for a block, all journal entries in that block are discarded. Journal entries that properly reflect written data may thus be unused for recovery, leading to potential loss of valid data or wasteful attempts to restore valid data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for fault tolerant parallel journaling that speeds up both input/output (I/O) operations and recovery operations. Journal entry writing may be parallel with data writing operations because, even if a crash occurs during a data writing operation for which the journal entry has been written, the recovery operation will correctly determine that the journal entry is not valid. Additionally, recovery operations may need to validate fewer journal entries, and yet possibly retain more valid data. Examples include: for each of a plurality of journal entries: receiving incoming data; determining a signature for the incoming data; generating the journal entry for the incoming data; writing the signature in the journal entry; and writing the journal entry and the incoming data to a storage media; and based at least on writing data to the storage media, updating an awaiting index in a journal header.

BRIEF DESCRIPTION OF THE DRAWINGS

The present description will be better understood from the following detailed description read in the light of the accompanying drawings, wherein:

FIG. 4 illustrates versions of an exemplary journal based on the example of FIG. 3, reflecting multiple manifestations of the flow chart of FIG. 2;

DETAILED DESCRIPTION

Figure 1:
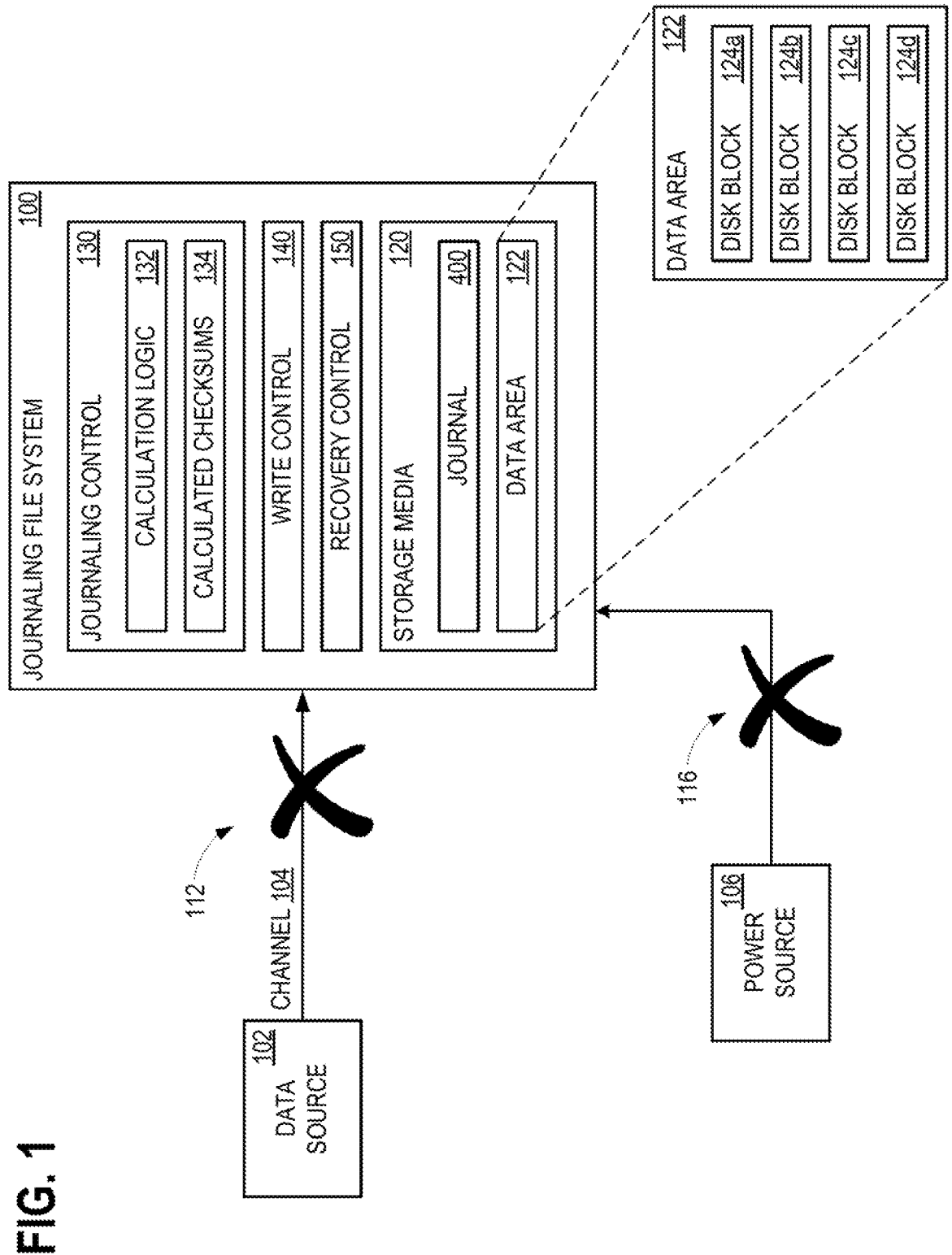
FIG. 1 illustrates a block diagram of an example journaling file system that can advantageously employ fault tolerant parallel journaling for file systems.

Various aspects of the systems and methods described herein provide at least a solution for parallel journaling that speeds up both input/output (I/O) operations and recovery operations. Journal entry writing is performed in parallel with data writing operations. In this disclosure, performing in parallel means journal entry writing and data writing operations are performed at the same time, at approximately or substantially the same time, not sequentially, and the like. In some examples, journal entry writing is performed or initiated prior to completion or initiation of the data writing operations. Even if a crash occurs during a data writing operation for which the journal entry has been written, the recovery operation correctly determines that the journal entry is not valid. Additionally, recovery operations may need to validate fewer journal entries, and yet possibly retain more valid data. Examples include: for each of a plurality of journal entries: receiving incoming data; determining a signature for the incoming data; generating the journal entry for the incoming data; writing the signature in the journal entry; and writing the journal entry and the incoming data to a storage media; and based at least on writing data to the storage media, updating an awaiting index in a journal header.

Aspects of the disclosure operate in an unconventional manner to permit journal writing and data writing operations to be conducted in parallel, rather than as sequential operations, by including a scheme that enables a recovery operation to determine which journal entries correspond to valid data. The journal entries are written in parallel with the data, and an index value in the journal header indicates a set of journal entries for which the corresponding data write operation has been reported as completed. The index is an awaiting index, because it identifies the first journal entry that is still awaiting the report of data writing completion. The awaiting index is updated in accordance with reports of data writing completion. In general, I/O latency is reduced because there is a mechanism to allow parallel data and journal writes, while maintaining crash consistency.

Aspects of the disclosure improve speed and reliability of computer crash recovery operations by writing a signature for the incoming data in the journal entry, which is useable during a recovery. Aspects of the disclosure further improve crash recovery by, based at least on beginning a recovery operation, determining a value of an awaiting index and, for journal entries beginning at the value of the awaiting index, determining validity of the signature in the journal entry. In this manner, it may be possible to reduce the number of discarded journal operations, improving computational efficiency. During recovery, the journal entries prior to the awaiting index do not require validation, but yet the corresponding data may be retained. Validation may instead begin at the first journal entry past the set for which the corresponding data write operation had been reported as completed, and is indicated by the awaiting index. This further improves the speed of computer crash recovery by increasing computational efficiency. Validation may occur using a data signature (e.g., checksum) or an update signature (e.g., an update generation number). Aspects of the disclosure advantageously speed up computer I/O operations by writing a journal entry to a storage media in parallel with writing incoming data to the storage media.

FIG. 1 illustrates a block diagram of an example journaling file system 100 that advantageously employs fault tolerant parallel journaling for file systems. In some examples, journaling file system 100 is implemented on one or more computing devices 700 of FIG. 7. Journaling file system 100 receives data for writing to a storage media 120 from a data source 102 over a channel 104, and is powered by a power source 106. In some examples, data source 102 is memory, such as random access memory (RAM) within the same computing device. In some examples, data source 102 is a remote node. Unfortunately, real-world performance constraints and limitations mean that channel 104 may experience an outage 112 that interrupts the flow of data from data source 102. Additionally, power source 106 may fail, resulting in a power interruption 116. Either of these incidents may cause a crash in the writing operations.

Because storage media 120 is a physical data storage device, such as a magnetic disk or another non-volatile storage medium, writing data into storage media 120 is not instantaneous. Instead, it requires time. If, during the time period in which data is being written into storage media 120, either outage 112 or power interruption 116 (e.g., a crash) occurs (or some other failure), the data not yet written will remain unwritten at least until recovery operations are complete. This means that the space on storage media 120, which had been reserved for incoming data that had not yet been written at the time of the crash, will have whatever data (if any) had been written previously. If, after the crash, that space on storage media 120 is read with the assumption that it was the data from data source 102, it will be corrupt (erroneous).

Therefore, a journaling control 130 manages a journal 400, so that recovery operations managed by a recovery control 150 can properly ascertain which data writing operations resulted in valid data being written to a data area 122 on storage media 120. Journal 400 is shown in four stages in FIGS. 4A-4D, and a generic example of journal 400 is illustrated in FIG. 3 as generic journal structure 300. The operations of journaling control 130 are described in relation to a flow chart 200 of FIG. 2. The operations of recovery control 150 are described in relation to a flow chart 500 of FIG. 5.

Figure 2:
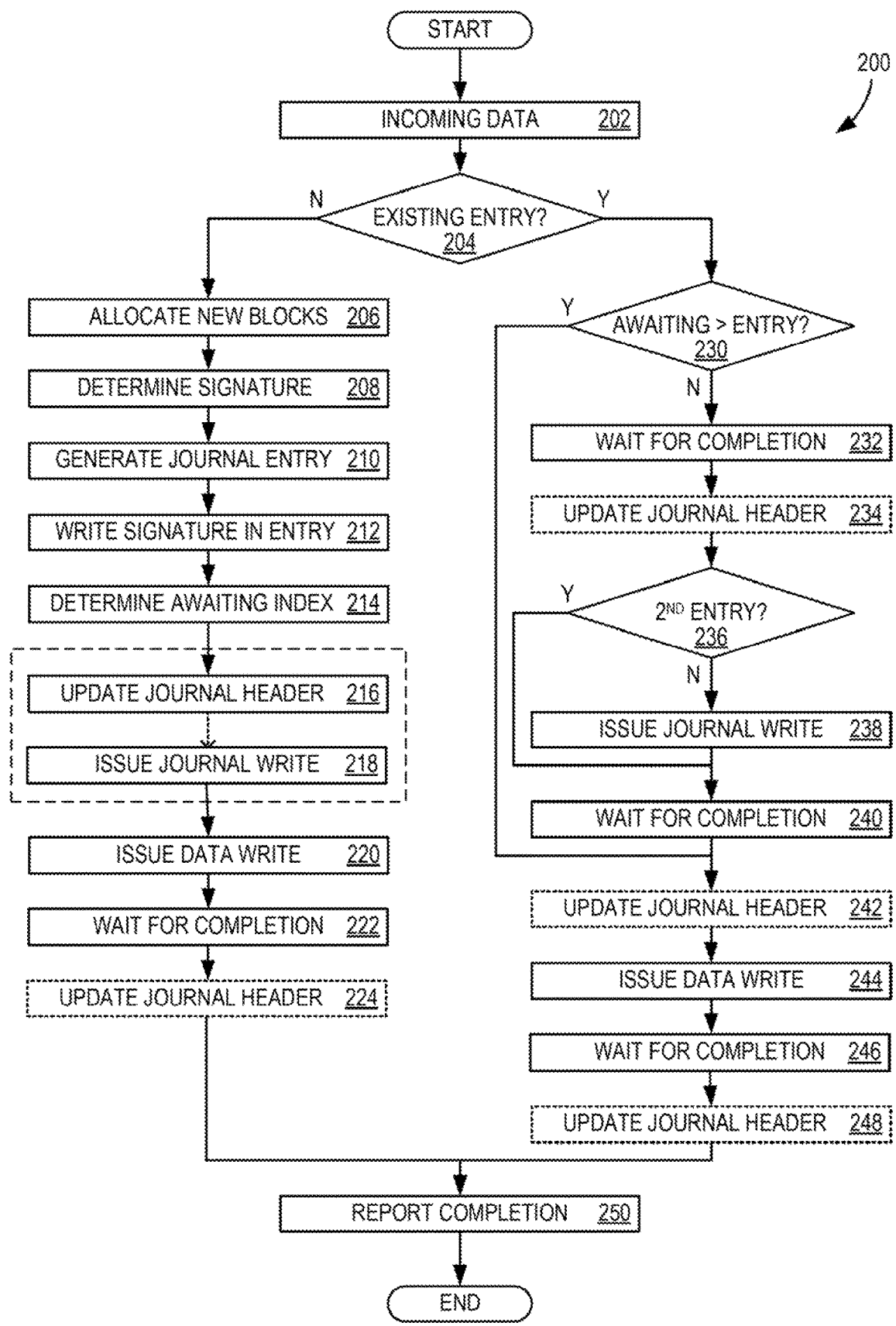
FIG. 2 illustrates a flow chart of exemplary operations associated with the journaling file system of FIG. 1.
Figure 3:
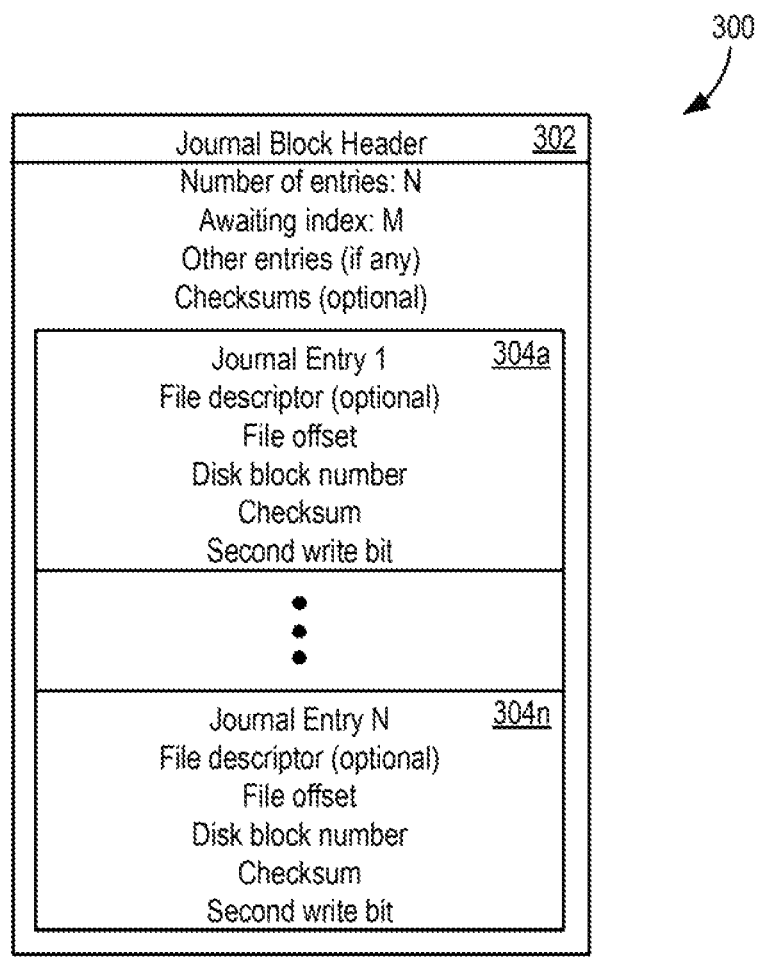
FIG. 3 illustrates an exemplary journal structure that may be used with the journaling file system of FIG. 1.

With reference now to FIG. 2, and continued reference to FIG. 1, operations of flow chart 200 will be described. In some examples, the operations of flow chart 200 are performed by one or more computing devices 700 of FIG. 7. Flow chart 200 illustrates operations for each iteration of incoming data. In situations in which multiple streams of incoming data arrive prior to flow chart 200 completing one of them, a manifestation of flow chart 200 exists for each stream of incoming data (and those manifestations may be completed in parallel to process the data streams). Operation 202 includes receiving incoming data. For each incoming data stream, a new manifestation of flow chart 200 will be spawned. That is, at least some operations of flow chart 200 are performed for each of a plurality of journal entries.

Decision operation 204 includes determining whether incoming data corresponds to an existing journal entry (e.g., as determined using the disk block and file offset). If not, then one or more disk blocks are allocated in operation 206, for example, disk blocks 124a-124d in data area 122. Operation 208 includes determining a signature for the incoming data. In some examples, the signature is a checksum, which is a form of a data signature. In some examples, the signature is an update generation number, which is a form of an update signature. Checksums are determined by calculation logic 132 in journaling control 130. At this stage, the signature is not placed in calculated checksums 134, because those values are used for validation during recovery. Rather, at this stage the signature is to be placed in the journal entry.

The journal entry for the incoming data is generated in operation 210. In some examples, this includes determining the file offset and the number of the newly allocated block. The signature is written to the journal entry, for example in the header of the journal entry, in operation 212. The awaiting index is determined in operation 214, and written into the journal header in operation 216. Operation 224 includes, based at least on writing a journal entry to storage media 120, updating a count of journal entries in the journal header. In some examples, updating the awaiting index (in operation 214) is opportunistic and is piggy-backed with the addition of new journal entries to the journal block. Operation 218 issues a journal write. In some examples, operations 216 and 218 are combined and issued as a single I/O operation. Operation 220 issues a data write, which are performed by write control 140. Together, operations 218 and 220 include writing the journal entry and the incoming data to storage media 120, for example in journal 400 and data area 122, respectively. In some examples, writing the journal entry to storage media 120 occurs in parallel with writing the incoming data to storage media 120.

Flow chart 200 waits at 222 for completion of both the journal and data writes. The journal header is optionally updated in operation 224, and is omitted in some examples to reduce I/O burdens. Operation 224 includes, based at least on writing a journal entry to storage media 120, updating a count of journal entries in the journal header. Operation 224 also includes, based at least on writing data to storage media 120, updating an awaiting index in the journal header. The I/O completion is reported in operation 250.

If, however, in decision operation 204, it is determined that the incoming data does correspond to an existing journal entry, then decision operation 230 determines whether the awaiting index is greater than the existing journal entry number. If so, this means that the first data write operation has completed, a journal update is not needed, and the new data write operation is allowed to proceed. So flow chart 200 skips to operation 242. If, however, the awaiting index is less than the index of the journal entry of the earlier, the first data write operation has not yet completed. A second journal entry is needed but will not be added at this time. Operation 232 includes, based at least on the incoming data corresponding to the existing journal entry, waiting for a data writing operation corresponding to the existing journal entry to complete. Upon completion of the data write, the awaiting index in the journal header is optionally updated in operation 234. Similarly to operation 224, operation 234 is omitted in some examples to reduce I/O burdens.

Decision operation 236 determines whether there is already a second journal entry for the offset. In some examples, a flag in the new journal entry is used to indicate that the entry is for a second write. If so, flow chart 200 skips to operation 240. If not, then operation 238 includes, based at least on completion of the data writing operation corresponding to the existing journal entry, writing a second journal entry. Operation 238 includes corresponding activity to operations 208-214, described above. Flow chart 200 waits for completion of the write operation at 240 and optionally updates the journal header at 242. Similarly to operation 224, operation 242 is omitted in some examples to reduce I/O burdens. A data write is issued in operation 244, and operation 246 waits for completion at 246. If there are more writes to the same block, they will be blocked until the second journal entry is written to the disk. The journal header is optionally updated at 248 with the number of entries and awaiting index, and I/O data operation completion is reported at 250. Similarly to operation 224, operation 248 is omitted in some examples to reduce I/O burdens.

The ability to perform parallel data and journal writing operations is enabled by placing a signature (e.g., a checksum) of the data block in its journal entry. Before issuing the writes, a checksum is calculated for each new data block and kept in the corresponding journal entry. In some examples, the checksum in the journal entry may be a combined checksum of the data block and its journal entry. By having a combined checksum, a separate checksum to ensure the integrity of the entire journal block can be eliminated. This not only saves space, but also renders the journal more resilient to corruption.

In some examples, if the journal write completes before the data write, the checksum of the disk block is recalculated and compared with the checksum stored in the journal entry. Data writing errors can then be addressed. In some examples, a partial checksum of the data block is written in the next journal block. The checksum is overwritten by the next write operation with the same mapping (e.g., disk block and file offset). The overwriting of the checksum acts as an acknowledgment of the completion of the earlier write operation. With this scheme, a second write operation waits for completion of the earlier write operation before overwriting its checksum. Write operation completion is reported to the issuer after completing both the data and journal writes. Metadata updates occur later, possibly in batches.

The awaiting index is retained in the header of each journal block, as shown in FIGS. 3 and 4. In some examples, when a new journal entry is added to a journal block, the status of the data writes of the earlier journal entries in the journal block is checked. This permits determination of the first journal entry in the journal block whose data or journal write is not yet completed, which is the value of the awaiting index. During a crash recovery, described in relation to FIG. 5, the integrity of the newly written data blocks can be validated by calculating the checksums of the data block and comparing them against the checksums stored in the corresponding journal entries. Checksum validation of all the journal entries before the awaiting index is not needed, because those mappings are already known to be valid. That is, only checksums of journal entries starting from the awaiting index require validation. This reduces number of checksum validations required, thereby speeding recovery operations. If there are duplicate journal entries for the same data block, their checksums are not validated against the data block. By having a checksum for every journal, it is only necessary to discard only those journal entries whose checksum does not match the calculated checksum. The fault domain is thus narrowed. Rather than discarding all of the entries, only corrupted entries are discarded.

If another write comes to a block which has an entry already in the journal, due to an earlier write to the same block, the new write is not allowed to proceed until the earlier data and journal writes are completely written to the disk. This is because the checksum of the new data may not match the checksum of the old data that is stored in the log journal. If the host crashes immediately after the second write, then during the recovery, the system may incorrectly determine that there was as an incomplete write and discard the journal entry and the data. This results in discarding valid data.

FIG. 3 illustrates an exemplary generic journal structure 300 that may be used with journaling file system 100 of FIG. 1. A journal block header 302 lists a number of journal entries, an awaiting index, and optionally, other entries and one or checksums. In some examples, one of the checksums is a checksum of the entire set of data blocks that correspond to journal entries. A first journal entry 304a includes an optional file descriptor, a file offset, a disk block number, and a checksum or other signature (e.g., an update generation number). The file offset and disk block number together identify the location of the corresponding data in the data area (e.g., data area 122 of storage media 120). A second write bit flag indicates whether that journal entry is for a second write of the same disk block and file offset. Multiple journal entries may exist. A second journal entry 304n indicates the final journal entry N, which indicates the number N identified by the number of entries in journal block header 302. The awaiting index M is generally a lower number than the number of entries.

FIG. 4 illustrates journal 400 of FIG. 1 for multiple manifestations of flow chart 200 of FIG. 2, which correspond to multiple incoming data streams. After a first pass through flow chart 200, journal 400 has the content illustrated by journal 400a. Journal header 402a indicates that there are two journal entries, which are shown below as journal entries 404a and 404b, and the awaiting index is 1. Journaling file system 100 allocated disk block 10001 to store data corresponding to journal entry 104a, which is set for file offset 123, and disk block 10001 to store data corresponding to journal entry 104b, which is set for file offset 456. The checksums are shown as XXXX and XXXY, respectively.

This value of 1 for the awaiting index in journal header 402a indicates that the first journal entry 404a is still awaiting completion. Thus, at least the manifestation of flow chart 200 corresponding to journal entry 404a has not yet completed operation 222. It is possible that the manifestation of flow chart 200 corresponding to journal entry 404b has already completed operation 222, but the awaiting index will not pass the value of 1 until the first manifestation reaches operation 250. So, at this point, journal 400a does not indicate the completion status for data corresponding to journal entry 404b.

For journal 400b, a third journal entry 404c has been added, as seen by the number of entries given as 3 in journal header 402b. Journaling file system 100 allocated disk block 10003 to store data corresponding to journal entry 104c, which is set for file offset 789 and has a checksum XXYY. At the time represented by journal 400b, only the data writing operation to block 10001, which corresponds to journal entry 404a, has been reported as completed. This is indicated by the awaiting index in journal header 402b having a value of 2, rather than 3. For journal 400c, a fourth journal entry 404d has been added, as seen by the number of entries given as 4 in journal header 402c. Journaling file system 100 allocated disk block 10004 to store data corresponding to journal entry 104d, which is set for file offset 999 and has a checksum XYYY. At the time represented by journal 400c, the data writing operation to block 10002, which corresponds to journal entry 404b, has been reported as completed. This is indicated by the awaiting index in journal header 402c now having a value of 3. If the data writing operation to block 10002 had not been reported as completed, the awaiting index in journal header 402c would have instead remained at a value of 2. In general, the number of entries and awaiting index may increment at different rates.

For journal 400d, a fifth journal entry 404e has been added, which is a duplicate entry for disk block 10003 and file offset 789. Journal header 402d indicates 5 entries and that the awaiting index is now 5, indicating that the write operations for data corresponding to journal entries 404c and 404d have now completed. Although new journal entry 404e indicates writing data to the same location, it is possible that the new data has some differences and will produce a different checksum. According to flow chart 200, because new journal entry 404e is for a second write for disk block 10003 and file offset 789 (journal entry 404c is for the first second write), it had waited for the earlier writing operation (corresponding to journal entry 404c) to be reported as completed, and was then added to journal 400d.

Figure 5:
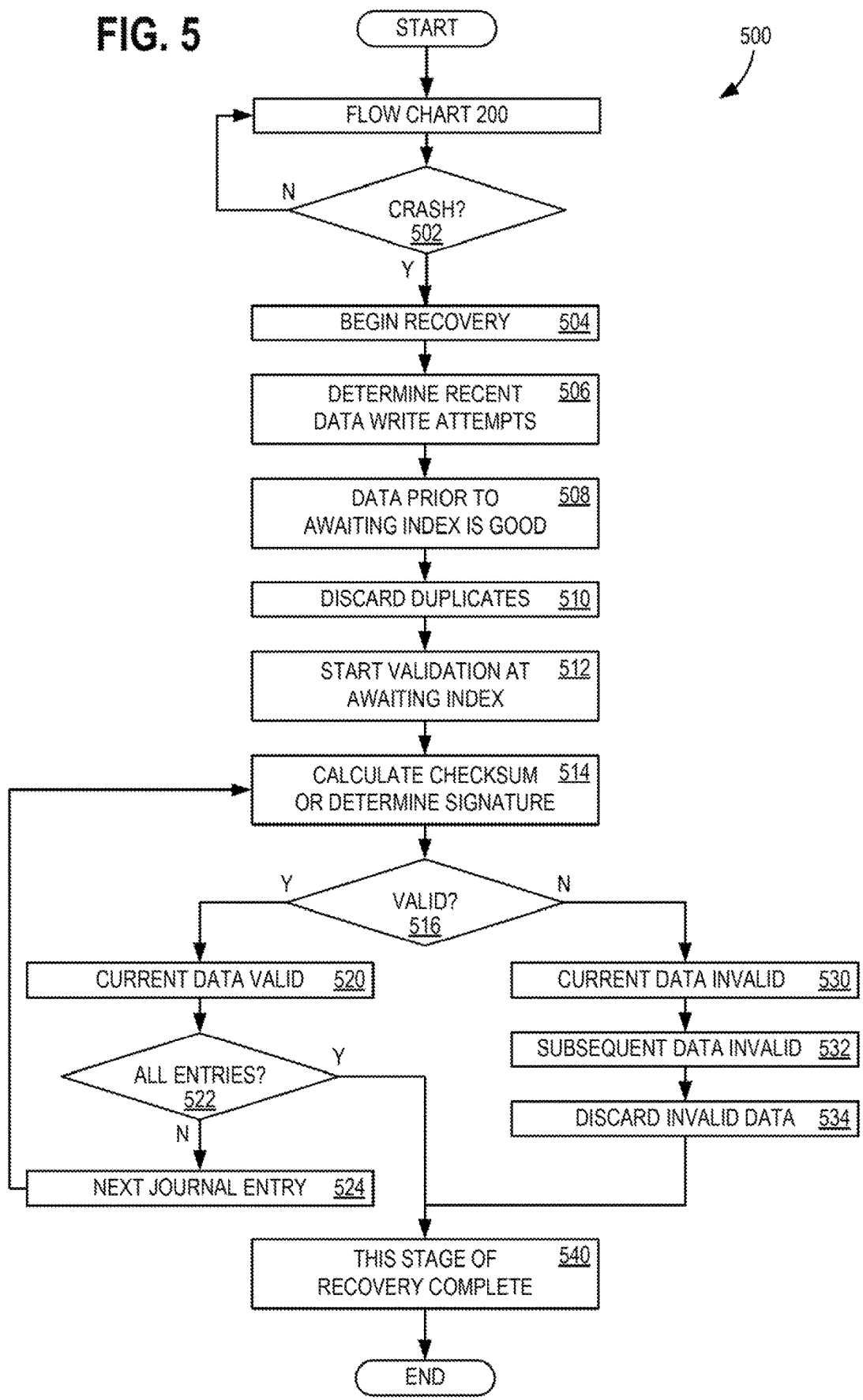
FIG. 5 illustrates another flow chart of exemplary operations associated with the journaling file system of FIG. 1.

FIG. 5 illustrates a flow chart 500 of exemplary recovery operations associated with journaling file system 100 of FIG. 1, for example at least partially under the direction of recovery control 150. With reference now to FIG. 5, and continued reference to FIG. 1, operations of flow chart 500 will be described. In some examples, the operations of flow chart 500 are performed by one or more computing devices 700 of FIG. 7. Flow chart 200 is performed as described above until a crash occurs at 502, for example triggered by either outage 112 or power interruption 116. Crash recovery begins in operation 504.

Recent write attempts are determined by examining journal 400 at 506. Operation 506 also includes, based at least on beginning a recovery operation, determining a value of the awaiting index. Operation 508 marks data corresponding to journal entries prior to the awaiting index as good. No validation is needed for that data, saving time. Operation 510 includes discarding duplicate journal entries. Validation begins for journal entries beginning at the value of the awaiting index, at 512. Operation 514 calculates the data checksum or determines the signature. The data in a data block can be validated in multiple ways, such as by using a data signature or using an update signature. A checksum is an example of a data signature, whereas an update generation number is an example of an update signature. If the underlying storage device provides a generation number for every block when it is written, the current generation number of the block can be used as a signature in the journal entry header. During crash recovery, the current generation number of the block is checked against the generation number stored in the journal entry. If the current generation number of the block is greater than the generation number stored in the journal, the block is valid. In some examples, the type of checksum algorithm or whether a generation number is used may be a configurable parameter. Checksums calculated in operation 514 may be saved in calculated checksums 134, for comparison with checksums within journal 400.

Decision operation 516 determines whether the header signature is valid. In some examples, decision operation 516 includes, for journal entries beginning at the value of the awaiting index, determining validity of a signature in a journal entry. In some examples, decision operation 516 includes determining validity of the signature which comprises calculating a checksum for data corresponding to the journal entry and determining whether the calculated checksum for the data matches the checksum in the journal entry. If the journal entry signature is valid, operation 520 includes, based at least on the signature being valid, determining that data corresponding to the journal entry is valid. If validation has occurred for all entries, as determined by decision operation 522, then operation 540 reports that the current stage of recovery is complete. If more entries remain to be validated, then operation 524 moves to the next journal entry and returns to operation 514.

If, however, the header signature is not valid in decision operation 516, operation 530 marks that data as invalid and operation 532 marks data corresponding to subsequent journal entries as invalid. Together, operations 530 and 532 include, based at least on the signature not being valid, determining that data corresponding to the journal entry and any subsequent journal entry is not valid. Operation 534 discards the invalid data.

Figure 6:
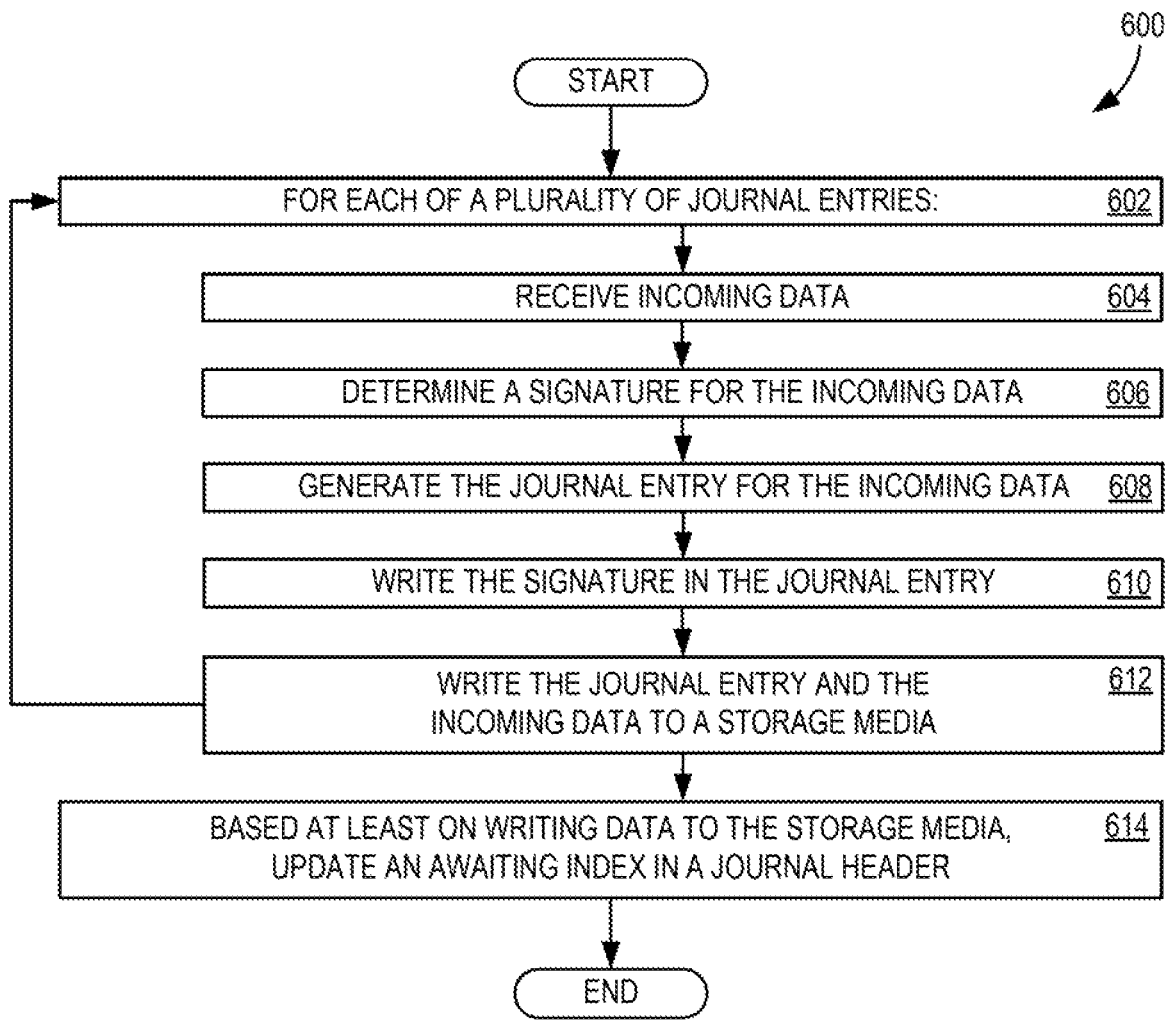
FIG. 6 illustrates another flow chart of exemplary operations associated with the journaling file system of FIG. 1.

FIG. 6 illustrates a flow chart 600 showing a method of fault tolerant parallel journaling. In some examples, the operations of flow chart 600 are performed by one or more computing devices 700 of FIG. 7. Operations 604-612 occur for each of a plurality of journal entries, as indicated by 602. Operation 604 includes receiving incoming data. Operation 606 includes determining a signature for the incoming data. Operation 608 includes generating the journal entry for the incoming data. Operation 610 includes writing the signature in the journal entry. Operation 612 includes writing the journal entry and the incoming data to a storage media. Operation 614 includes, based at least on writing data to the storage media, updating an awaiting index in a journal header. Because operations 604-612 occur for each of a plurality of journal entries, which correspond to each of a plurality of incoming data streams, operation 614 for one journal entry may occur in parallel with operations 604-612 for other journal entries. As each journal entry passes through all of operations 604-612, it moves into operation 614 while other journal entries may still be within the set of operations 604-612.

Figure 7:
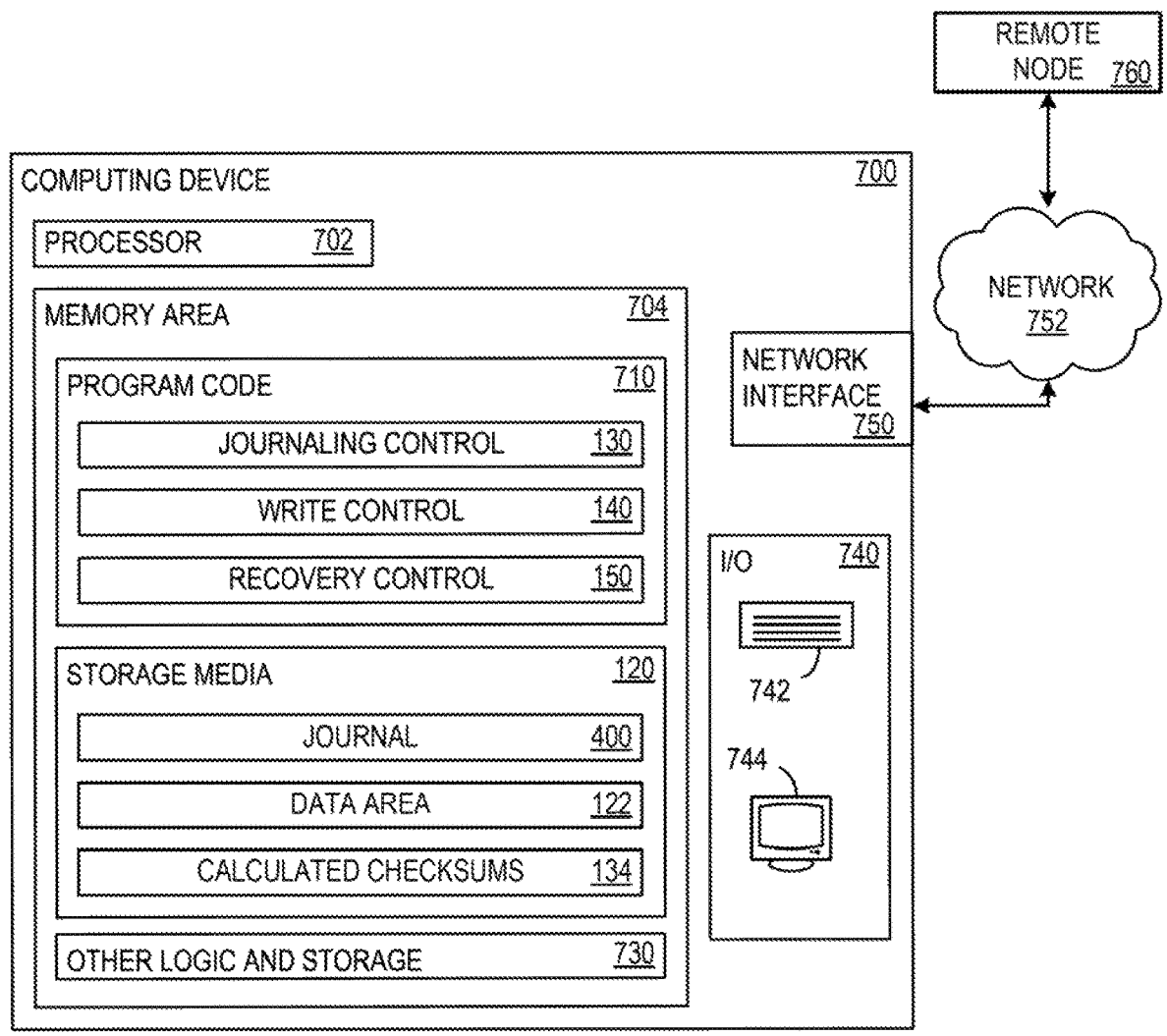
FIG. 7 illustrates a block diagram of a computing device that may host the journaling file system of FIG. 1, according to an example embodiment.

FIG. 7 illustrates a block diagram of computing device 700 that may host journaling file system 100 of FIG. 1. Computing device 700 has at least a processor 702 and a memory area 704 (or memory 704) that holds program code 710, storage media 120, and other logic and storage 730. Memory area 704 is any device allowing information, such as computer executable instructions and/or other data, to be stored and retrieved. For example, memory area 704 may include one or more random access memory (RAM) modules, flash memory modules, hard disks, solid-state disks, and/or optical disks. Program code 710 comprises computer executable instructions and computer executable components including journaling control 130, write control 140, and recovery control 150. In some examples, program code 710 is stored within storage media 120.

Storage media 120 holds journal 400, data area 122, and calculated checksums 134. Memory area 704 also includes other logic and storage 730 that performs or facilitates other functions disclosed herein or otherwise required of computing device 700. A keyboard 742 and a computer monitor 744 are illustrated as exemplary portions of I/O component 740, which may also or instead include a touchscreen, mouse, trackpad, and/or other I/O devices. A network interface 750 permits communication over a network 752 with a remote node 760, which may represent another implementation of computing device 700, a cloud service, or data source 102 of in FIG. 1.

Computing device 700 generally represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

ADDITIONAL EXAMPLES

An example system for fault tolerant parallel journaling comprises: a processor; and a computer-readable medium storing instructions that are operative upon execution by the processor to: for each of a plurality of journal entries: receive incoming data; determine a signature for the incoming data; generate the journal entry for the incoming data; write the signature in the journal entry; and write the journal entry and the incoming data to a storage media; and based at least on writing data to the storage media, update an awaiting index in a journal header.

An exemplary method of fault tolerant parallel journaling comprises: for each of a plurality of journal entries: receiving incoming data; determining a signature for the incoming data; generating the journal entry for the incoming data; writing the signature in the journal entry; and writing the journal entry and the incoming data to a storage media; and based at least on writing data to the storage media, updating an awaiting index in a journal header.

One or more exemplary non-transitory computer storage medium have computer-executable instructions that, upon execution by a processor, cause the processor to at least perform operations that comprise: for each of a plurality of journal entries: receiving incoming data; determining a signature for the incoming data; generating the journal entry for the incoming data; writing the signature in the journal entry; and writing the journal entry and the incoming data to a storage media; and based at least on writing data to the storage media, updating an awaiting index in a journal header.

Alternatively, or in addition to the other examples described herein, examples include any combination of the following:

writing the journal entry to the storage media occurs in parallel with writing the incoming data to the storage media;

the signature is a checksum or an update generation number;

based at least on writing a journal entry to the storage media, updating a count of journal entries in the journal header;

determining whether incoming data corresponds to an existing journal entry;

based at least on the incoming data corresponding to the existing journal entry, waiting for a data writing operation corresponding to the existing journal entry to complete;

based at least on completion of the data writing operation corresponding to the existing journal entry, writing a second journal entry;

based at least on beginning a recovery operation, determining a value of the awaiting index;

for journal entries beginning at the value of the awaiting index, determining validity of a signature in a journal entry;

based at least on the signature being valid, determining that data corresponding to the journal entry is valid;

based at least on the signature not being valid, determining that data corresponding to the journal entry and any subsequent journal entry is not valid;

the signature is a checksum;

determining validity of the signature comprises calculating a checksum for data corresponding to the journal entry and determining whether the calculated checksum for the data matches the checksum in the journal entry; and reporting an I/O data operation completion.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for presenting programs. For example, the elements illustrated in the figures, such as when encoded to perform the operations illustrated in the figures, constitute exemplary means for fault tolerant parallel journaling, and exemplary means for writing journal entries to a storage media in parallel with writing incoming data to the storage media.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of fault tolerant parallel journaling, the method comprising:
   for each of a plurality of journal entries:
      receiving incoming data;
      determining a signature for the incoming data;
      generating the journal entry for the incoming data;
      writing the signature in the journal entry; and
      writing the journal entry to a storage media in parallel with writing the incoming data to the storage media; and
   based at least on writing data to the storage media, updating an awaiting index in a journal header.

2. The method of claim 1, wherein writing the journal entry to the storage media completes before writing the incoming data to the storage media completes.

3. The method of claim 1, wherein the signature is a checksum or an update generation number.

4. The method of claim 1, further comprising:
based at least on writing the journal entry to the storage media, updating a count of journal entries in the journal header.

5. The method of claim 1, further comprising:
determining whether the incoming data corresponds to an existing journal entry;
based at least on the incoming data corresponding to the existing journal entry, waiting for a data writing operation corresponding to the existing journal entry to complete; and
based at least on completion of the data writing operation corresponding to the existing journal entry, writing a second journal entry.

6. The method of claim 1, wherein the awaiting index identifies a first journal entry in the plurality of journal entries that is awaiting completion of the writing of the incoming data to the storage media, the method further comprising:
based at least on beginning a recovery operation, determining a value of the awaiting index;
for journal entries beginning at the value of the awaiting index, determining validity of a signature in the first journal entry;
based at least on the signature in the first journal entry being valid, determining that data corresponding to the first journal entry is valid; and
based at least on the signature not being valid, determining that data corresponding to the first journal entry and any subsequent journal entry is not valid.

7. The method of claim 6, wherein the signature in the first journal entry is a checksum and wherein determining validity of the signature comprises:
calculating a checksum for data corresponding to the first journal entry; and
determining whether the calculated checksum for the data matches the checksum in the first journal entry.

8. A computer system for fault tolerant parallel journaling, the computer system comprising:
a processor; and
a non-transitory computer readable medium having stored thereon program code for transferring data to another computer system, the program code causing the processor to:
for each of a plurality of journal entries:
receive incoming data;
determine a signature for the incoming data;
generate the journal entry for the incoming data;
write the signature in the journal entry; and
write the journal entry to a storage media in parallel with writing the incoming data to the storage media; and
based at least on writing data to the storage media, update an awaiting index in a journal header.

9. The computer system of claim 8, wherein writing the journal entry to the storage media completes before writing the incoming data to the storage media completes.

10. The computer system of claim 8, wherein the signature is a checksum or an update generation number.

11. The computer system of claim 8, wherein the program code is further operative to:
based at least on writing the journal entry to the storage media, update a count of journal entries in the journal header.

12. The computer system of claim 8, wherein the program code is further operative to:
determine whether the incoming data corresponds to an existing journal entry;
based at least on the incoming data corresponding to the existing journal entry, wait for a data writing operation corresponding to the existing journal entry to complete; and
based at least on completion of the data writing operation corresponding to the existing journal entry, write a second journal entry.

13. The computer system of claim 8, wherein the awaiting index identifies a first journal entry in the plurality of journal entries that is awaiting completion of the writing of the incoming data to the storage media, wherein the program code is further operative to:
based at least on beginning a recovery operation, determine a value of the awaiting index;
for journal entries beginning at the value of the awaiting index, determine validity of a signature in the first journal entry;
based at least on the signature in the first journal entry being valid, determine that data corresponding to the first journal entry is valid; and
based at least on the signature not being valid, determine that data corresponding to the first journal entry and any subsequent journal entry is not valid.

14. The computer system of claim 13, wherein the signature in the first journal entry is a checksum and wherein determining validity of the signature comprises:
calculating a checksum for data corresponding to the first journal entry; and
determining whether the calculated checksum for the data matches the checksum in the first journal entry.

15. A non-transitory computer readable storage medium having stored thereon program code executable by a first computer system at a first site, the program code embodying a method comprising:
for each of a plurality of journal entries:
receiving incoming data;
determining a signature for the incoming data;
generating the journal entry for the incoming data;
writing the signature in the journal entry; and
writing the journal entry to a storage media in parallel with writing the incoming data to the storage media; and
based at least on writing data to the storage media, updating an awaiting index in a journal header.

16. The non-transitory computer storage medium of claim 15, wherein writing the journal entry to the storage media completes before writing the incoming data to the storage media completes.

17. The non-transitory computer storage medium of claim 15, wherein the signature is a checksum or an update generation number.

18. The non-transitory computer storage medium of claim 15, wherein the program code further comprises:
based at least on writing the journal entry to the storage media, updating a count of journal entries in the journal header.

19. The non-transitory computer storage medium of claim 15, wherein the program code further comprises:
determining whether the incoming data corresponds to an existing journal entry;
based at least on the incoming data corresponding to the existing journal entry, waiting for a data writing operation corresponding to the existing journal entry to complete; and based at least on completion of the data writing operation corresponding to the existing journal entry, writing a second journal entry.

20. The non-transitory computer storage medium of claim 15, wherein the awaiting index identifies a first journal entry in the plurality of journal entries that is awaiting completion of the writing of the incoming data to the storage media, wherein the program code further comprises:

based at least on beginning a recovery operation, determining a value of the awaiting index;

for journal entries beginning at the value of the awaiting index, determining validity of a signature in the first journal entry;

based at least on the signature in the first journal entry being valid, determining that data corresponding to the first journal entry is valid; and based at least on the signature not being valid, determining that data corresponding to the first journal entry and any subsequent journal entry is not valid.

* * * * *